(12) United States Patent
Harrison et al.

(10) Patent No.: US 7,721,955 B2
(45) Date of Patent: May 25, 2010

(54) SECURE TRANSACTION METHOD AND TRANSACTION TERMINAL FOR USE IN IMPLEMENTING SUCH METHOD

(75) Inventors: Keith Alexander Harrison, Bristol (GB); William John Munro, Bristol (GB); Stephen James Crane, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 615 days.

(21) Appl. No.: 11/455,317

(22) Filed: Jun. 16, 2006

(65) Prior Publication Data

US 2007/0016534 A1  Jan. 18, 2007

(30) Foreign Application Priority Data

Jun. 16, 2005  (GB)  ................................. 0512229.6
Sep. 29, 2005  (GB)  ................................. 0519842.9

(51) Int. Cl.
G06K 5/00  (2006.01)
H04L 9/00  (2006.01)
G06F 21/00  (2006.01)

(52) U.S. Cl. ......................... 235/380; 380/263; 705/50
(58) Field of Classification Search ......... 380/259–260, 380/270, 44–47, 278, 28, 286, 263; 235/379–380
See application file for complete search history.

(56) References Cited

U.S. PATENT DOCUMENTS

| | | | | |
|---|---|---|---|---|
| 4,536,647 A | | 8/1985 | Atalla et al. | .................. 705/70 |
| 4,684,248 A | | 8/1987 | Cinzori | ....................... 356/143 |
| 5,515,438 A | * | 5/1996 | Bennett et al. | .............. 380/278 |
| 5,770,850 A | | 6/1998 | Bowen et al. | ............ 250/203.1 |
| 6,081,792 A | * | 6/2000 | Cucinotta et al. | ............. 705/43 |
| 6,748,083 B2 | * | 6/2004 | Hughes et al. | .............. 380/278 |
| 7,430,295 B1 | * | 9/2008 | Pearson et al. | .............. 380/256 |
| 2002/0165835 A1 | * | 11/2002 | Igval | ........................... 705/401 |
| 2005/0167512 A1 | * | 8/2005 | Minemura et al. | .......... 235/492 |
| 2006/0083379 A1 | * | 4/2006 | Brookner | .................... 380/286 |

FOREIGN PATENT DOCUMENTS

EP  1024626 A1 * 8/2000
WO  01/86855 A2  11/2001

OTHER PUBLICATIONS

Bennett, C.H., et al.,"Generalized Privacy Amplification", *IEEE Transactions on Information Theory*, vol. 41, No. 6, pp. 1915-1923 (Nov. 1995).

(Continued)

*Primary Examiner*—Thien M. Le
*Assistant Examiner*—Sonji Johnson

(57) ABSTRACT

A secure transaction method is provided for publicly-accessible transaction terminals. The method uses quantum key distribution (QKD) between a hand-portable QKD device and a complimentary QKD apparatus incorporated the transaction terminal. After the QKD device has been brought up to the transaction terminal, the QKD device and the complimentary QKD apparatus of the terminal are is used to provide the device and terminal with new secret shared random material. The new secret shared random material is then used to establish a secure classical communication channel between the device and transaction terminal for conducting a transaction. An ATM terminal and POS terminal that use quantum key distribution are also disclosed.

22 Claims, 4 Drawing Sheets

OTHER PUBLICATIONS

Huttner, B., et al., "Short Distance Applications of Quantum Cryptography", *Journal of Nonlinear Optical Physics and Materials*, vol. 5, No. 4, pp. 823-832 (1996).

Lo, H-K., "Insecurity of Quantum Secure Computations", downloaded from http://citeseer.ist.psu.edu (May 1998).

Lomanaco Jr., S.J., "A Quick Glance at Quantum Cryptography" *Cryptologia*, vol. 23, No. 1, pp. 1-41 (Nov. 8, 1998).

Nguyen, T., et al., "Integration of Quantum Cryptography in 802.11 Networks" *Proc. of First International Conference on Availability, Reliability and Security*, (Apr. 20-22, 2006).

* cited by examiner

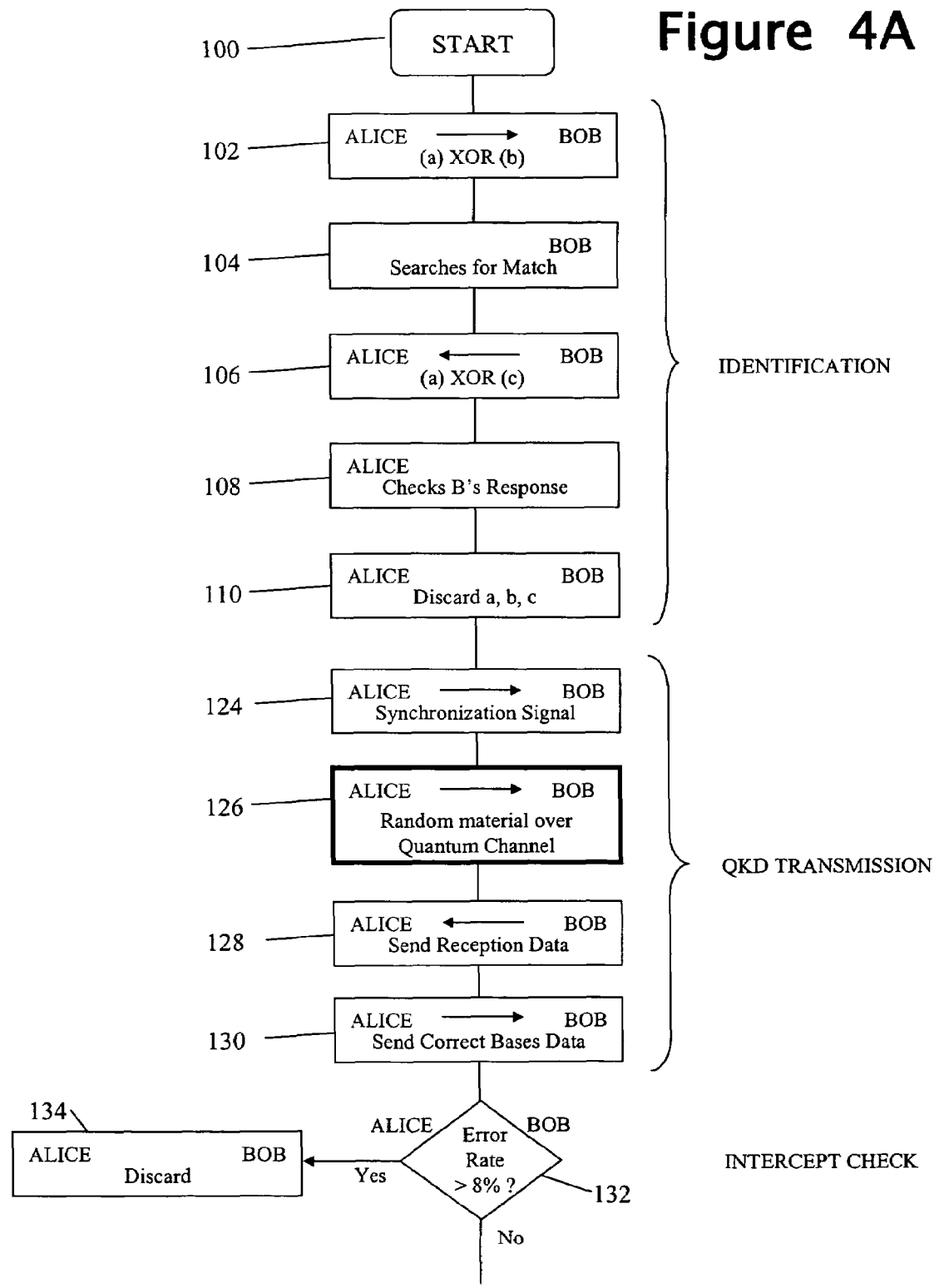

SECURE TRANSACTION METHOD AND TRANSACTION TERMINAL FOR USE IN IMPLEMENTING SUCH METHOD

FIELD OF THE INVENTION

The present invention relates to a secure transaction method for publicly-accessible transaction terminals and to transaction terminals for use in implementing the secure transaction method.

As used herein the term "publicly accessible" as applied to a transaction terminal does not require that all members of the general public have access to the terminal but rather that the terminal is accessible to a group of persons wider than the trusted members of the organisation responsible for the transaction terminal.

BACKGROUND OF THE INVENTION

A known problem with current publicly-accessible card-operated transaction terminals such as ATM terminals, is that it is possible for a third party to interpose an illicit card reader in the slot intended for inserting a card into the genuine card reader of the terminal. As a result, it is possible for the third party to capture information off the card and misuse it. An attack of this type is often referred to as a "shim" attack.

Of course, most card-based transaction terminals also require the input of a PIN (personal identification number) supposedly only known to the genuine card user. however, it is possible for a third party to gain knowledge of a PIN by covert observation during PIN entry by the user at a transaction terminal, this observation being effected either by the third party in person or by use of a concealed camera.

It is an object of the present invention to enable increased security for transactions effected at a publicly-accessible transaction terminal.

SUMMARY OF THE INVENTION

According to one aspect of the present invention, there is provided a secure transaction method using quantum key distribution, herein QKD, the method comprising:
  bringing a portable QKD device that incorporates QKD apparatus up to complimentary QKD apparatus incorporated in a publicly-accessible transaction terminal;
  using the QKD apparatus of the device and terminal to provide the device and transaction terminal with new secret shared random material; and
  thereupon using the new secret shared random material to establish a secure classical communication channel between the device and transaction terminal over which a transaction is then conducted.

According to another aspect of the present invention, there is provided an ATM terminal comprising:
  a quantum key distribution (QKD) subsystem arranged to inter-work with a complimentary QKD subsystem of a portable device operated by a user physically present at the ATM terminal, to provision the device and ATM terminal with new secret random material known only to the device and ATM terminal;
  a classical communications transceiver; and
  a transaction processing subsystem arranged to use the new secret random material provisioned to the device and ATM terminal during a current session of user interaction with the ATM terminal, to establish a secure channel with the device via said classical communications transceiver, the transaction processing subsystem being further arranged to use the secure channel to conduct a transaction with the device user.

According to a further aspect of the present invention, there is provided a POS terminal comprising:
  a quantum key distribution (QKD) subsystem arranged to inter-work with a complimentary QKD subsystem of a portable device operated by a user physically present at the POS terminal, to provision the device and POS terminal with new secret random material known only to the device and POS terminal;
  a classical communications transceiver; and
  a transaction processing subsystem arranged to use the new secret random material provisioned to the device and POS terminal during a current session of user interaction with the POS terminal, to establish a secure channel with the device via said classical communications transceiver, the transaction processing subsystem being further arranged to use the secure channel to conduct a transaction with the device user.

BRIEF DESCRIPTION OF THE DRAWINGS

The present invention will now be described, by way of example only, with reference to the accompanying diagrammatic drawings of example embodiments, in which:

FIGS. 4A and 4B together form a functional flow diagram illustrating an example method of operation of the system shown in FIGS. 1-3.

DESCRIPTION OF THE PREFERRED EMBODIMENTS

Figure 1:
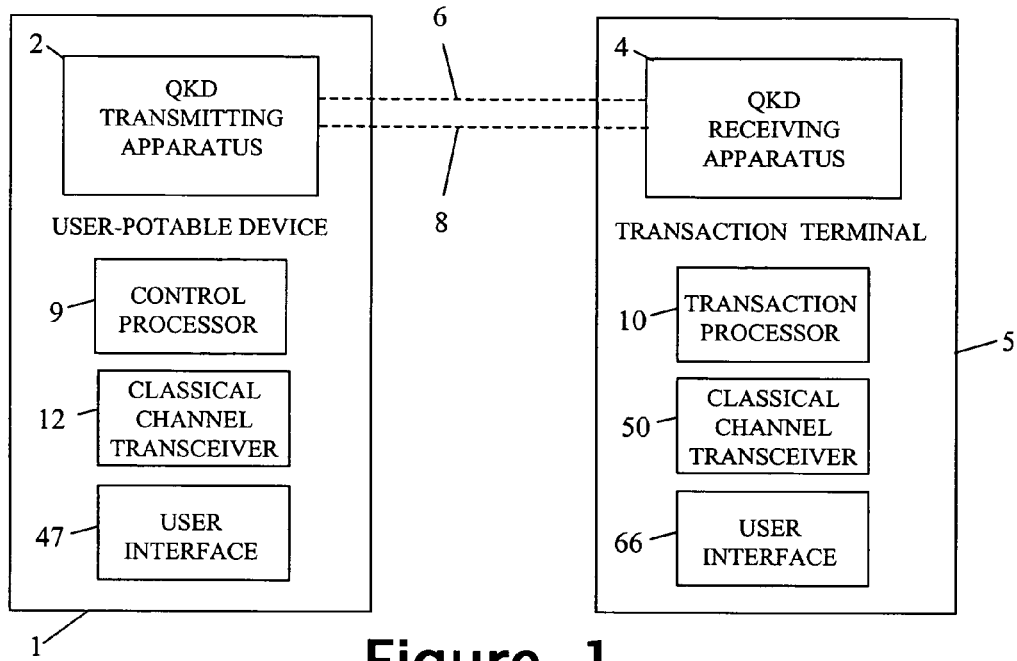
FIG. 1 is a schematic illustration of a quantum key distribution system embodying the present invention.

Referring to FIG. 1 of the accompanying drawings there is shown a user-portable device 1 and a transaction terminal 5.

The user-portable devices I can be any mobile device such as a mobile phone, Personal Digital Assistant (PDA), laptop, digital camera etc. the transaction terminal 5 is a publicly-accessible terminal such as an ATM terminal or point-of-sale (POS) terminal.

The device 1 incorporates quantum-key-distribution (QKD) transmitting apparatus 2 arranged to inter-work with complimentary QKD receiving apparatus 4 of the transaction terminal 5. The device 1 comprises, in addition to the QKD transmitting apparatus 4:
  a control processor 9 (with associated program and data memories, not separately shown) for controlling the overall operation of the device,
  a classical communications channel transceiver 12 (that is, one not relying on quantum technology) such as an Infrared Data (IrDA) transceiver, a BLUETOOTH (Trade Mark) transceiver, the normal wireless communication transceiver of a mobile phone where the device 1 takes this form, or even an interface for a wired connection; and
  a user interface 47 such as a keypad and display.

The transaction terminal 5 comprises, in addition to the QKD receiving apparatus 4:
  a transaction processor 9;

a classical communications channel transceiver 50 arranged to inter-communicate with the transceiver 12 of the device 2; and a user interface 66.

In the course of inter-working of the QKD transmitting apparatus 2 and QKD receiving apparatus 4 two channels are established between the transmitting apparatus 2 and the receiving apparatus 4. The first channel 6 is a classical communication channel typically established via the transceiver 12 and 50 of the device 1 and terminal 5 (though separate classical channel transceivers could be provided in the QKD transmitting apparatus 2 and QKD receiving apparatus 4 for their exclusive use). The second channel 8 is a quantum channel provided by the sending of a quantum signal from the QKD transmitting apparatus 2 to the QKD receiving apparatus.

A quantum signal, in the present context, is a signal capable of conveying sufficient data to enable a quantum cryptographic transaction with another entity. Thus, for example, in one embodiment, a source and transmitter are required which are capable of preparing and transmitting the quantum state which it is desired to send to a requisite degree of accuracy.

A requirement for the successful transmission of the quantum signal in the quantum channel 8 is that the quantum signal is correctly aligned with a quantum signal detector of the receiving apparatus 4, both directionally and such that the polarization directions of the transmitting and receiving apparatus 2, 4 have the same orientation. This can be achieved by using a mounting cradle or similar physical structure (not shown) configured to seat the device 1 in a particular orientation. With the cradle appropriately fixed in position in front of the receiving apparatus 4 (the cradle can, for example be manufactured as an integral part of the structure of the receiving apparatus 4), when the device 1 is correctly seated in the cradle the desired alignment between the QKD transmitting and receiving apparatus 2 and 4 is achieved. Alternatively, an active alignment system can be provided that uses an alignment channel between the transmitting and receiving apparatus to generate alignment adjustment signals for use in aligning the transmitting apparatus 2 and the receiving apparatus 4; example active alignment systems are disclosed in the co-pending application, herein incorporated by reference, identified below:

Filing Date: same as the present application;
Title: "Quantum Key Distribution Apparatus & Method";
Applicants/Assignees:
Hewlett-Packard Development Company, and
The University of Bristol (UK).
Priorities Claimed:
Jun. 16, 2005 from UK 0512229.6, and
Sep. 29, 2005 from UK 0519842.9

It will be assumed hereinafter that appropriate measures have been taken to ensure that the quantum signal output by the transmitting apparatus 2 is correctly aligned with the quantum signal detector of the receiving apparatus 4.

Figure 2:
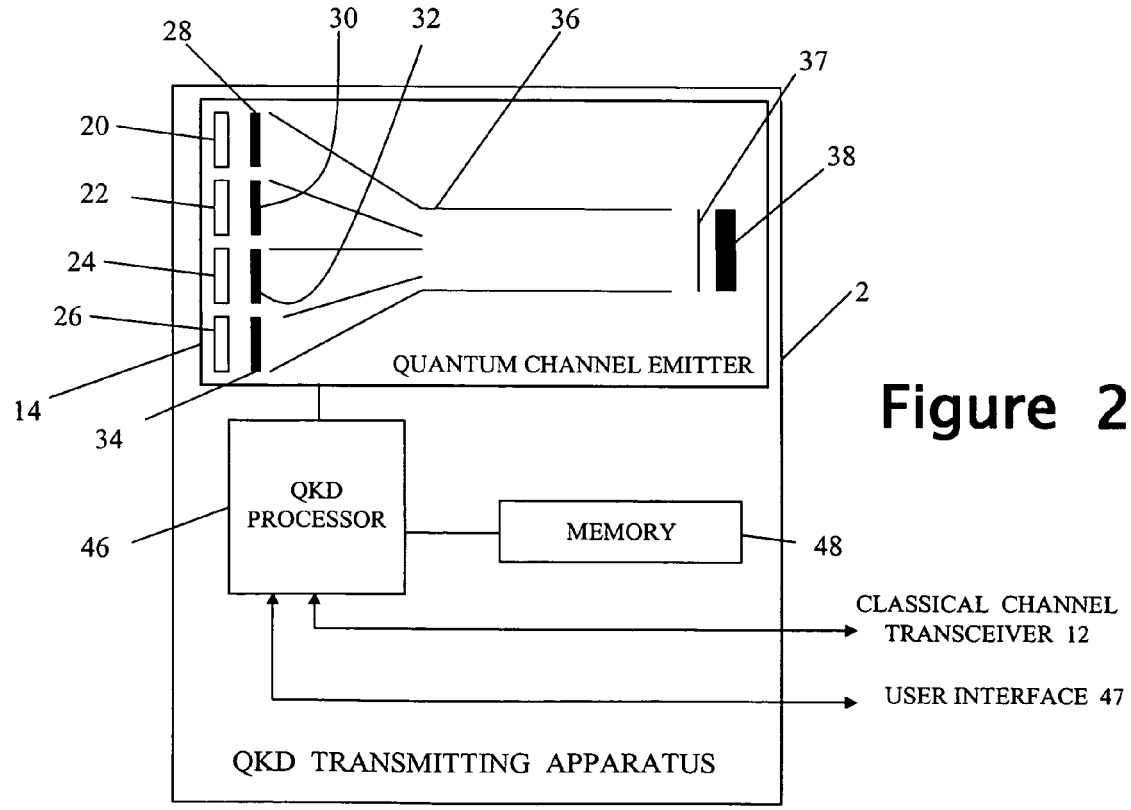
FIG. 2 is a schematic illustration of an embodiment of a quantum key distribution transmitting apparatus usable in the FIG. 1 system.

Referring to FIG. 2 of the accompanying drawings, the QKD transmitting apparatus 2 is shown to comprise a quantum channel emitter 14, a processor 46 and a memory 48 for storing both data and control programs for controlling operation of the processor 46 to operate the transmitting apparatus 2 in the manner described below. The functions provided by the processor 46 and memory 48 could alternatively be provided by the control processor 9 of the device 1. As already noted, the QKD transmitting apparatus 2 makes use of the classical channel transceiver 12 to provide a data communication channel between itself and the QKD receiving apparatus 4; the transmitting apparatus 2 also uses the user interface 47 of the device 1 for interfacing with a user (though, again, a dedicated use interface could be provided for the QKD transmitting apparatus).

The quantum channel emitter 14 comprises an array of light emitting diodes (LEDs) 20, 22, 24 and 26. In front of each LED 20, 22, 24 and 26 is a respective polarising filter 28, 30, 32, 34. Filter 28 polarises the photons emitted from LED 20 vertically, filter 30 polarises the photons emitted from LED 22 horizontally, filter 32 polarises the photons emitted from LED 24 diagonally and filter 34 polarises the photons emitted from LED 26 anti-diagonally (the directions of polarisation are stated relative to an intended orientation of the apparatus 2 when in use). Thus, after passing through the filters 28, 30, 32, 34, the photons are polarised in four directions, each at 45° to another thus providing two pairs of orthogonal polarisations. The LEDs 20, 22, 24, 26 are narrow frequency emitters such as those available from Agilent Technologies, Inc. of 395 Page Mill Rd, Palo Alto, Calif. 94306, United States e.g., one of the Sunpower series, emitting at 590 nm or 615 nm.

A fibre optic light guide 36 is provided to convey the polarised photons to an attenuation filter 37 and narrow band pass frequency filter 38. The purpose of the attenuation filter 37 is to reduce the number of photons emitted and the frequency filter 38 is to restrict the emitted photons to a narrow frequency range (typically plus or minus 1 nm). Without the attenuation filter 37 in place the number of photons emitted per LED pulse would be of the order of one million. With the filter in place, the average emission rate is 1 photon per 100 pulses. Importantly this means that more than one photon is rarely emitted per pulse. The attenuation filter 37 and frequency filter 38 can be combined in a single device if preferred. A spatial filter is provided to limit light leakage outside the channel.

Figure 3:
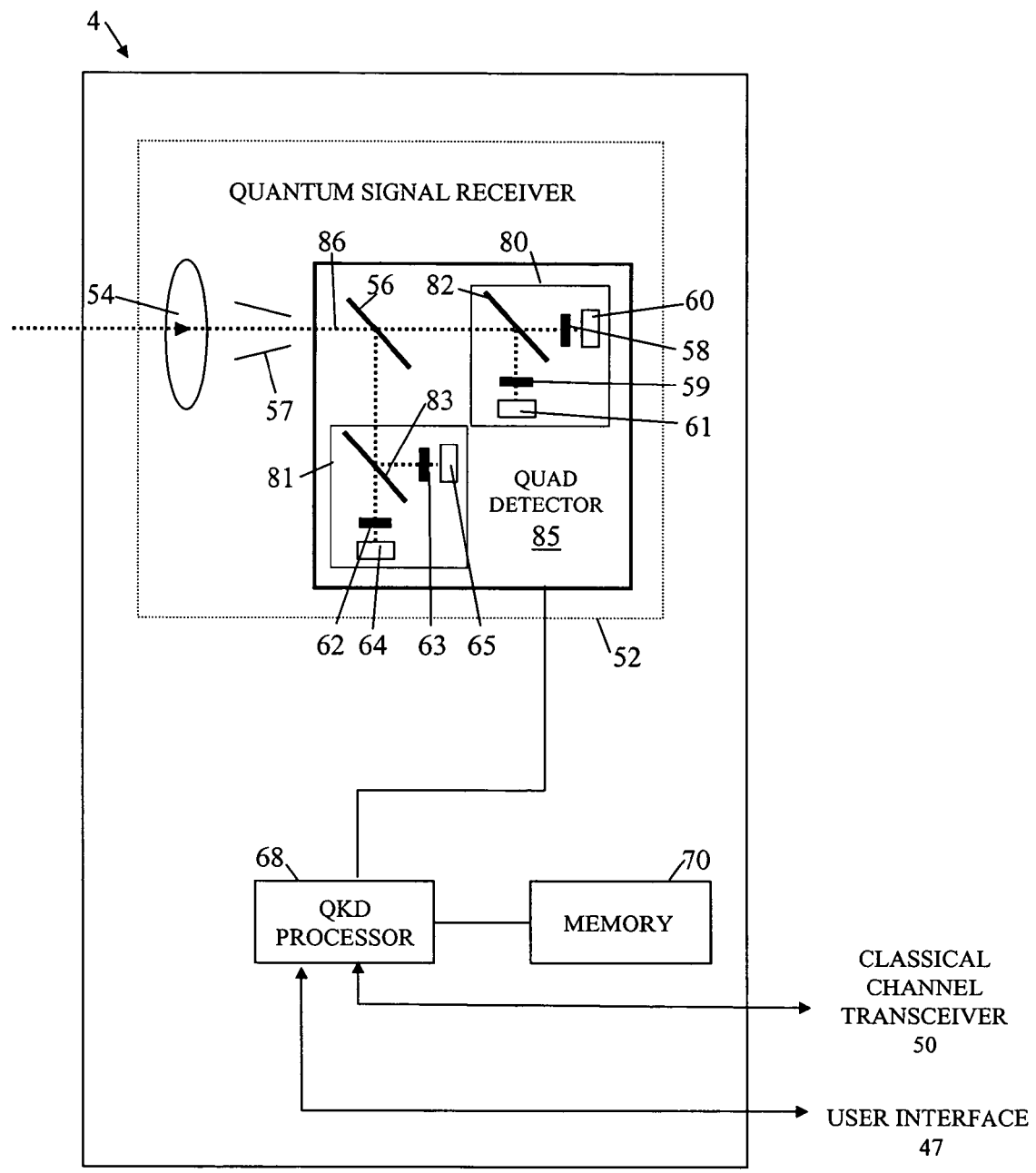
FIG. 3 is a schematic illustration of an embodiment of a quantum key distribution receiving apparatus usable in the FIG. 1 system.

The QKD receiving apparatus 4 is further explained with reference to FIG. 3 of the accompanying drawings. The receiving apparatus 4 comprises a quantum signal receiver 52 for receiving the quantum signal output from the QKD transmitting apparatus 2, a processor 68, and a memory 70 for storing both data and control programs for controlling operation of the processor 68 to operate the QKD receiving apparatus 4 in the manner described below. The functions provided by the processor 68 and memory 70 could alternatively be provided by the transaction processor 10 of the transaction terminal 5. As already noted, the QKD receiving apparatus 4 makes use of the classical channel transceiver 12 to provide a data communication channel between itself and the QKD transmitting apparatus 2; the receiving apparatus 4 also uses the user interface 66 of the terminal 5 for interfacing with a user (though, again, a dedicated use interface could be provided for the QKD receiving apparatus).

The quantum signal receiver 53 comprises a lens 54, a quad-detector arrangement 85, and a fibre optic light guide for conveying photons received through the lens to the quad-detector arrangement 85. The end of the light guide 57 nearest the lens 54 is fixed on the optical axis of the lens 55. The quad-detector arrangement 85 comprises a beam splitter 56, a first paired-detector unit 80, and a second paired-detector unit 81. The first paired-detector unit 80 comprises a beam splitter 82, polarizers 58, 59, and detectors 60, 61. The second paired-detector unit 81 comprises a beam splitter 83, polarizers 62, 63, and detectors 64, 65. The polarizers 58, 59 of the first paired-detector unit 80 have their directions of polarization orthogonal to each other; similarly, the polarizers 58, 59 of the second paired-detector unit 81 also have their directions of polarization orthogonal to each other. The polarization directions of the polarizers of the first paired-detector unit 80 are at 45° to the polarization directions of the polarizers of the second paired-detector unit 81. The beam splitters 56, 82 and 83 are depicted in FIG. 3 as half-silvered mirrors but can be of other forms such as diffraction gratings.

The detectors 60, 61, 64, 65 are avalanche photo-diodes, such as those available from Perkin Elmer Optoelectronics of 22001 Dumberry Road, Vaudreuil, Quebec, Canada, J7V 8P7 types C30902E, C30902S, C30921E and C30921S.

Dotted line 86 depicts the paths of photons passing through the lens 54 to the detectors 60, 61, 64 and 65 of the quad-detector arrangement 85.

Use of the device 1 in operating the transaction terminal 5 will now be described with reference to FIGS. 4A and B of the accompanying drawings.

Figure 4B:
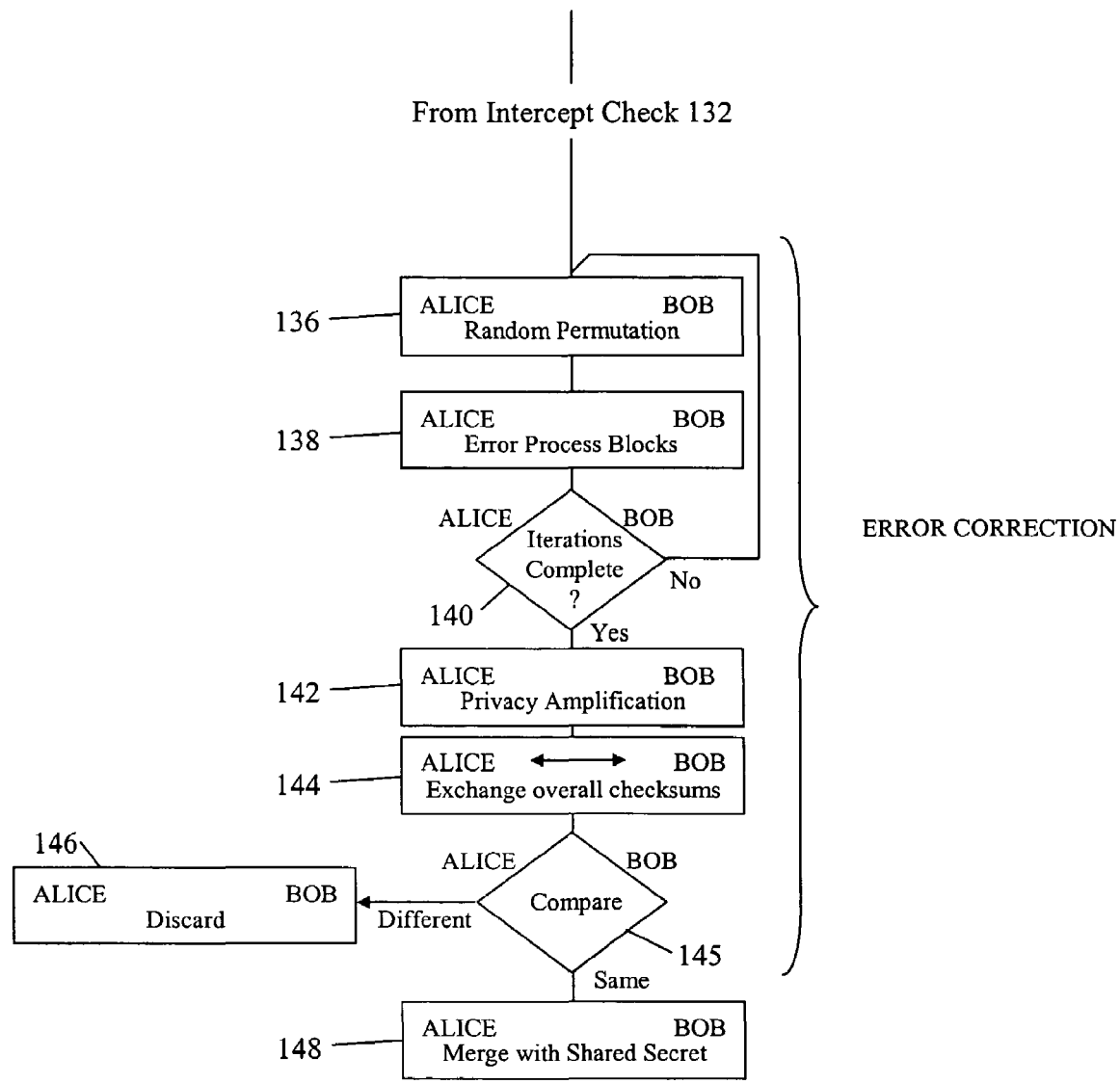

The convention is followed that the transmitting side for the quantum signal is referred to as Alice and the receiving side as Bob. In FIGS. 4A and 4B, the appearance of the name of Alice and/or Bob in block capitals in relation to a particular step indicates the active involvement of Alice and/or Bob, as the case may be, in that step.

When a user activates the QKD transmitting apparatus 2 in step 100 (FIG. 4A) via the user interface 47, Alice will initiate a dialog with Bob using the classical communication channelset up via the transceivers 12 and 50. Alice tells Bob who she is and Bob responds by telling Alice who he is. According to the present embodiment, this is done using a cache of shared secrets possessed by Alice and Bob and either generated by previous interactions between them or downloaded from a trusted source Where the transaction terminal 5 is part of a network of such terminals, there may either be a unique set of shared secrets associated with Alice and the particular terminal (Bob) currently being used by Alice (in which case, each terminal will typically itself store the respective set of shared secrets it has in common with Alice), or the terminals may all use the same set of shared secrets for working with Alice (in which case the shared secrets are typically centrally stored for access by all terminals as required). Typically, the shared secrets will be of the order of 100 kbits to 10 Mbits long. The shared secrets can be considered as composed of: a||b||c||rest_of_secrets where a, b and c are, for example, each 64 bits (the symbol || representing string concatenation).

In step 102, Alice transmits (a) XOR (b) to Bob where XOR is the exclusive function. In step 104, Bob searches through his set of shared secrets looking for a match. Once the match is found, in step 106 Bob transmits (a) XOR (c) back to Alice. In step 108, Alice checks that this is the correct response. Both Alice and Bob then, in step 110, delete a, b and c from their set of shared secrets. i.e. shared secrets=rest_of_secrets.

When the QKD transmitting apparatus 2 and the QKD receiving apparatus 4 are optically aligned, the quantum signal emitted by the emitter 14 will pass through the lens 54 and be guided by optical fibre 57 to the quad-detector arrangement 85, and the polarization directions of the signal will align with those of the quad-detection arrangement 85.

Once the quantum channel has been established, a quantum key transfer can be made.

The transfer of information based on quantum cryptography is carried out using a variant of the BB84 quantum coding scheme. The specific algorithm according to the preferred embodiment will now be described.

Alice and Bob have a predetermined agreement as to the length of a time slot in which a unit of data will be emitted. To achieve initial synchronisation, Alice in step 124 (see FIG. 4A) overdrives the alignment emitter 40 to produce a "START" synchronisation signal. Alternatively, the quantum signal channel can be used for synchronisation.

In step 126, Alice randomly generates a multiplicity of pairs of bits, typically of the order of $10^8$ pairs. Each pair of bits consists of a message bit and a basis bit, the latter indicating the pair of polarization directions to be used for sending the message bit, be it vertical/horizontal or diagonal/anti-diagonal. A horizontally or diagonally polarised photon indicates a binary 1, while a vertically or anti-diagonally polarised photon indicates a binary 0. The message bit of each pair is thus sent over the quantum signal channel encoded according to the pair of polarization directions indicated by the basis bit of the same pair. Randomness in generating the pairs of bits can be achieved by a hardware random number generator such as a quantum-based arrangement in which a half-silvered mirror is used to pass/deflect photons to detectors to correspondingly generate a "0"/"1" with a 50:50 chance; an alternative form of random number generator can be constructed based around overdriving a resistor or diode to take advantage of the electron noise to trigger a random event.

When receiving the quantum signal from Alice, Bob randomly chooses which basis (pair of polarization directions) it will use to detect the quantum signal during each time slot and records the results.

The sending of the message bits of the randomly-generated pairs of bits is the only communication that need occur using the quantum channel. The remainder of the algorithm is carried out using the classical channel.

In step 128, Bob informs Alice of the time slots in which a signal was received and the basis (i.e. pair of polarization directions) thereof.

In step 130, Alice sends to Bob confirmation of which of those bases is correct. Alice and Bob then use the bits corresponding to the time slots where they used the same bases, as the initial new shared secret data. However, there may well be discrepancies (errors) between the versions of the new shared secret data held by Alice and Bob due, for example, to noise in the quad detector arrangement 85.

In step 132, error rate checking is carried out by Alice and Bob comparing their versions of a selected subset of the initial new shared secret data. The higher the error rate, the greater the probability is that the quantum signal has been intercepted. Error rates above about 12% are generally unacceptable and, preferably, an upper threshold of 8% is set since above this figure the number of bits available after error correction and privacy amplification is too low.

If the error rate is found to be greater than the 8% threshold, the session is abandoned and the new shared secret data is discarded (step 134).

If the error rate is below the 8% threshold, error correction is then carried out on the initial new shared secret data (after the latter have been reduced by discarding the subsets used for error rate determination).

Error correction is effected using a version of the CASCADE algorithm in which two basic steps 136, 138 (see FIG. 4B) are repeated until a stable condition is reached (typically after six or seven iterations); alternatively, and as indicated by step 140 in FIG. 6B, the number of iterations can be fixed. The two basic steps are:

(1) A preliminary step 136 in which Alice and Bob effect the same random permutation of their respective versions of the new shared secret data. This is done as follows. Alice and Bob use the same subset of bits (typically 64 bits) of their new shared secret data as a seed for a deterministic pseudo random number generator. This pseudo random number generator is used to permute the data. This way both Alice and Bob will permute their data in the same way. The shared secret is then reduced by the subset used as the seed for the random number generator.

This permutation step is designed to do two things—it uniformly redistributes the bits in error and also make life difficult for external observers (who do not know how the bits are being redistributed).

The remaining new shared secret data is then treated as if divided into blocks of a size chosen such that for the measured error rate each block has, on average, one error.

(2) An error elimination step 138 in which Alice and Bob process each block of their respective versions of the shared secret data as follows. Both Alice and Bob determine the parity of the block and Bob sends its parity value to Alice. If Alice finds that Bob's parity value is the same value as Alice has determined for her block, that block is accepted as error free (although it could have any even number of errors); if Alice finds that her parity value differs from Bob's, the block is assumed to have one error (though it could have any odd number of errors); in this case, a binary search process is followed to track down the error. This search process involves the steps of halving the block in error, and determining which half contains the error by Bob sending Alice the parity of one of the half blocks which Alice compares with her parity value for the corresponding half block in her possession; if the parity values differ, the errored half block is the one being processed whereas if the parity values are the same, the errored half block is the one not being processed. The foregoing steps are then repeated for the errored half block and so on until the errored bit is identified). The errored bit is then either discarded or Bob flips the value of his version of the bit.

The above-described error correction process will generally achieve an error level of $1:10^6$ or better which is sufficient for present purposes.

However, it will be appreciated that the error correction process involves the exchange of considerable amounts of parity information between Bob and Alice which is potentially of use to an eavesdropper. It is also to be noted that although the error-rate-based intercept check carried out in step 132 will detect interception of any substantial portion of the quantum signal transmission, an eavesdropper may still be able to successfully intercept a small number of bits of the quantum signal as there will be a finite (though very small) probability that more than one photon is sent during a time slot over the quantum channel thereby leaving open the possibility that an eavesdropper with a beam splitter can capture one photon while allowing Bob to receive the other photon. Accordingly, a privacy amplification step 142 is next performed. In this step both Alice and Bob reduce the size of their respective versions of the new shared secret data using a deterministic randomizing permutation, the reduction in size being dependent on the amount of parity information exchanged and the level of security required.

A detailed discussion of privacy amplification can be found, for example, in the paper "Generalized Privacy Amplification", C. H. Bennett, G. Brassard, C. Crepeau, and U. M. Maurer; IEEE transactions on Information Theory, IT-41 (6), p 1915-1923. In general terms, it can be said that if the new shared secret x has a length of n bit after error correction, and the eavesdropper has at most k deterministic bits of information about the new shared secret, then if an appropriate class of hash function h( ) is applied to the secret random data:

$$\{0,1\}^n \rightarrow \{0,1\}^{n-k-s}$$

where s is a safety parameter $0<s<n-k$, the eavesdroppers expected information on h(x) is no more than $(2^{-s}/\ln 2)$ bits. Thus varying the value of (n−k−s) gives different levels of security for the result of the hash of x; in particular, increasing s increases the level of security.

After the error correction and privacy amplification, Alice and Bob are very likely to have the same result. However, in step 144 Alice and Bob seek to re-assure themselves that this is the case by exchanging a hash of their new shared secret data; to protect the transmitted hash, it is XORed with bits popped from the store of shared secrets. If the hashes differ (checked in step 145), the newly shared data is discarded (step 146) together with the bits used from the store of shared secrets.

On the assumption that Alice and Bob have the same new data, they merge the new data in with the existing shared secret. This merging involves the use of a hash function to ensure that the external observer has no knowledge of the final shared secret. Data from this new shared secret random data is then used to generate a session key (for example, a 128 bit session key) for encrypting the exchange of application data between the transmitting apparatus and receiving apparatus over the classical channel, the data used for creating the session key being discarded from the shared secret.

Once the session key has been generated, the desired transaction can be effected securely with the device user controlling the flow of the transaction by input made via the user interface 47 of the device 1; the transaction processor 10 of the terminal 5 is responsible for carrying out the desired transaction using the data it receives over the communications channel secured using the session key.

It may be noted that the derivation of the new secret shared random data using the QKD subsystems is effected in the same session of user interaction with the terminal 5 as the transaction secured by use of this data. Should the user fail to initiate a transaction after the new secret random data has been provisioned to the device and terminal, the terminal is arranged to time out after a predetermined period and require that a new session be started beginning with the generation and sharing of further new secret random data.

Because in the described embodiment of the present invention the interception of a QKD signal can be detected, it is no longer possible to use a "shim" attack against the transaction terminal 5 thereby ensuring the security of the communications channel encrypted using the random data shared between the device 1 and terminal 5.

It will be appreciated that many variations are possible to the above-described embodiment of the invention. Thus, for example, although in the described embodiment the quantum signal emitter has been placed in the mobile device and the quantum signal detector in the complementary base station apparatus, it would alternatively be possible to put the quantum signal emitter in the complementary apparatus and the quantum signal detector in the mobile device.

Furthermore, although in the above described method the newly generated and shared secret random data has been combined with a stored shared secret to form new secret shared random data for use in securing a classical communication channel between the device 1 and terminal 5, it is also possible to use the newly generated and shared secret random data directly as new secret shared random data for securing the classical communication channel, that is, without combining it with a stored secret. Indeed, the use of a stored shared secret can be dispensed with entirely (though in this case some other way must be provided to authenticate the user to the transaction terminal 5, for example, public/private key pairs can be used along with public key certificates issued by a trusted authority).

Also, rather than using the new secret shared random data to generate a session key for securing the classical communications channel, elements of the new secret shared random data can be combined (for example, using an XOR function) with data to be sent over the communications channel thereby encrypting that data; the original data is subsequently recovered from the encrypted data sent over the channel by using the same elements of the new secret shared random material (for example, the elements are XORed with the encrypted data).

Where the transaction method implemented by the transaction terminal requires the input of a user PIN, then in order to minimise the chances of the input of the PIN being observed, the device 1 is preferably arranged to permit the PIN to be input into the device in advance, that is, away from the transaction terminal which the device user intends to use. The device temporarily stores the PIN in the device and in due course the PIN is sent to the transactional terminal over the secure classical communication channel established between the device and terminal; thereafter, the PIN is removed from the device.

The invention claimed is:

1. A secure transaction method using quantum key distribution, herein QKD, the method comprising:
bringing a portable QKD device that incorporates a QKD apparatus up to a complimentary QKD apparatus incorporated in a publicly-accessible transaction terminal;
providing the device and transaction terminal with new secret shared random material using the QKD apparatus of the device and the complementary QKD apparatus of the terminal; and
thereupon using the new secret shared random material to establish a secure classical communication channel between the device and transaction terminal over which a transaction is then conducted.

2. A secure transaction method according to claim 1, wherein said user temporarily stores a PIN in the device before approaching the transaction terminal, the PIN being subsequently sent to the transactional terminal over said secure classical communication channel and thereafter removed from the device.

3. A secure transaction method according to claim 1, wherein said new secret shared random material is in the form of newly-generated random material shared between the QKD apparatus of the device and the complimentary QKD apparatus of the transaction terminal.

4. A secure transaction method according to claim 1, wherein said new secret shared random material is formed by the QKD apparatus of the device and the complimentary QKD apparatus of the terminal sharing newly-generated random material and each then combining this newly-generated random material in a predetermined manner with further secret random material already held by the device and terminal.

5. A secure transaction method according to claim 1, wherein said new secret shared random material is used to establish a secure classical communication channel between the device and transaction terminal by encrypting data to be sent securely over the channel by combining that data with elements of said secret shared random material, the original data being subsequently recovered from the encrypted data sent over the channel by using the same said elements of said secret shared random material.

6. A secure transaction method according to claim 1, wherein said new secret shared random material is used to establish a secure classical communication channel between the device and transaction terminal by encrypting data to be sent securely over the channel using a symmetric key generated separately by the device and transaction terminal from said new secret shared random material.

7. A secure transaction method according to claim 1, wherein said transaction terminal is an ATM terminal.

8. A secure transaction method according to claim 1, wherein said transaction terminal is a point-of-sale terminal.

9. An ATM terminal comprising:
a quantum key distribution (QKD) subsystem arranged to inter-work with a complimentary QKD subsystem of a portable device operated by a user physically present at the ATM terminal, to provision the device and ATM terminal with new secret random material known only to the device and ATM terminal;
a classical communications transceiver; and
a transaction processing subsystem arranged to use the new secret random material provisioned to the device and ATM terminal during a current session of user interaction with the ATM terminal, to establish a secure channel with the device via said classical communications transceiver, the transaction processing subsystem being further arranged to use the secure channel to conduct a transaction with the device user.

10. An ATM terminal according to claim 9, wherein said transaction processing subsystem is arranged to require the receipt of a user PIN over said secure channel before conducting said transaction.

11. An ATM terminal according to claim 9, wherein said QKD subsystem of the terminal is arranged to use as said new secret shared random material, newly-generated random material shared between the QKD subsystem of the terminal and the complimentary QKD subsystem of the portable device.

12. An ATM terminal according to claim 9, wherein said QKD subsystem of the terminal is arranged to form said new secret shared random material by combining newly-generated random material shared between the QKD subsystem of the terminal and the complimentary QKD subsystem of the portable device, with further secret random material already held by the QKD subsystem of the terminal.

13. An ATM terminal according to claim 9, wherein said transaction processing subsystem is arranged to use said new secret shared random material to establish a secure classical communication channel between the terminal and the portable device by encrypting data to be sent securely over the channel to the device by combining that data with elements of said secret shared random material.

14. An ATM terminal according to claim 9, wherein said transaction processing subsystem is arranged to use said new secret shared random material to establish a secure classical communication channel between the terminal and the portable device by encrypting data to be sent securely over the channel to the device using a symmetric key generated said transaction processing subsystem from said new secret shared random material.

15. An ATM terminal according to claim 9, further comprising a physical structure for seating said portable device in a position such that the QKD subsystem of the device is correctly aligned with the QKD subsystem of the terminal.

16. A POS terminal comprising:
a quantum key distribution (QKD) subsystem arranged to inter-work with a complimentary QKD subsystem of a portable device operated by a user physically present at the POS terminal, to provision the device and POS terminal with new secret random material known only to the device and POS terminal;
a classical communications transceiver; and a transaction processing subsystem arranged to use the new secret random material provisioned to the device and POS terminal during a current session of user interaction with the POS terminal, to establish a secure channel with the device via said classical communications transceiver, the transaction processing subsystem being further arranged to use the secure channel to conduct a transaction with the device user.

17. A POS terminal according to claim 16, wherein said transaction processing subsystem is arranged to require the receipt of a user PIN over said secure channel before conducting said transaction.

18. A POS terminal according to claim 16, wherein said QKD subsystem of the terminal is arranged to use as said new secret shared random material, newly-generated random material shared between the QKD subsystem of the terminal and the complimentary QKD subsystem of the portable device.

19. A POS terminal according to claim 16, wherein said QKD subsystem of the terminal is arranged to form said new secret shared random material by combining newly-generated random material shared between the QKD subsystem of the terminal and the complimentary QKD subsystem of the portable device, with further secret random material already held by the QKD subsystem of the terminal.

20. A POS terminal according to claim 16, wherein said transaction processing subsystem is arranged to use said new secret shared random material to establish a secure classical communication channel between the terminal and the portable device by encrypting data to be sent securely over the channel to the device by combining that data with elements of said secret shared random material.

21. A POS terminal according to claim 16, wherein said transaction processing subsystem is arranged to use said new secret shared random material to establish a secure classical communication channel between the terminal and the portable device by encrypting data to be sent securely over the channel to the device using a symmetric key generated said transaction processing subsystem from said new secret shared random material.

22. A POS terminal according to claim 16, further comprising a physical structure for seating said portable device in a position such that the QKD subsystem of the device is correctly aligned with the QKD subsystem of the terminal.

* * * * *